United States Patent
Ketels

(10) Patent No.: US 7,467,995 B2
(45) Date of Patent: Dec. 23, 2008

(54) APPARATUS FOR POSITIONING FISH FOR HEADING

(76) Inventor: Dieter Ketels, Fliederhof 11, Grossenbrode (DE) 23775

(*) Notice: Subject to any disclaimer, the term of this patent is extended or adjusted under 35 U.S.C. 154(b) by 426 days.

(21) Appl. No.: 11/445,914

(22) Filed: Jun. 1, 2006

(65) Prior Publication Data
US 2006/0292972 A1 Dec. 28, 2006

(30) Foreign Application Priority Data
Jun. 1, 2005 (DE) ............... 10 2005 025 482

(51) Int. Cl.
*A22C 25/16* (2006.01)
(52) U.S. Cl. ................................. 452/162
(58) Field of Classification Search ......... 452/149–153, 452/154, 160–163, 166, 170, 177, 180, 182, 452/183; 198/400, 411, 412, 385
See application file for complete search history.

(56) References Cited

U.S. PATENT DOCUMENTS

| | | | |
|---|---|---|---|
| 2,961,697 A | 11/1960 | Schlichting | |
| 3,364,517 A | 1/1968 | Bartels | |
| 3,525,121 A | 8/1970 | Elich | |
| 3,680,174 A | 8/1972 | Dohrendorf | |
| 3,838,478 A | 10/1974 | Wulff | |
| 3,972,091 A | 8/1976 | Dohrendorf | |
| 4,151,629 A | 5/1979 | Braeger | |
| 4,389,750 A * | 6/1983 | Kristinsson et al. | 452/154 |
| 4,463,478 A * | 8/1984 | Hartmann et al. | 452/154 |
| 4,599,765 A | 7/1986 | Kristinsson | |
| 4,630,335 A | 12/1986 | Claudon | |
| 5,358,441 A * | 10/1994 | Hjorth | 452/180 |
| 5,466,186 A | 11/1995 | Hjorth | |
| 5,482,502 A | 1/1996 | Hjorth | |

(Continued)

FOREIGN PATENT DOCUMENTS

GB 1 372 060 10/1974

(Continued)

OTHER PUBLICATIONS

De Silva, C.W., et al., "An Innovative Machine for Automated Cutting of Fish," Proceedings of IEE/ASME Transactions on Mechatronics 2(2):68-98, Jun. 1997.

*Primary Examiner*—Thomas Price
(74) *Attorney, Agent, or Firm*—Christensen O'Connor Johnson Kindness PLLC

(57) ABSTRACT

A method and device for positioning a fish is presented. In an exemplary method, a fish is positioned in relation to a cutting plane. Pressure is applied to a rising area of the fish's head via a pressure part such that the fish is displaced in the direction of the fish's body, thereby positioning the fish for heading. Thereafter, the fish is headed. In another embodiment, an exemplary device for positioning a fish in a heading machine comprises a pressure part having a pressure surface configured to be lowered onto to a surface area of the fish that is rising relative to the substrate on which the fish is placed. The pressure surface is configured to slide against the rising area of the fish. Under a force of the pressure surface of the pressure part being lowered onto the rising area of the fish, the fish is displaced and positioned for heading.

40 Claims, 14 Drawing Sheets

U.S. PATENT DOCUMENTS

| | | |
|---|---|---|
| 5,492,502 A | 2/1996 | Hjorth |
| 5,536,205 A | 7/1996 | Braeger |
| 5,735,735 A | 4/1998 | Hahn |
| 6,200,211 B1 | 3/2001 | Braeger |
| 6,361,426 B1 * | 3/2002 | Kragh ............... 452/161 |
| 6,688,962 B1 * | 2/2004 | Ketels et al. ............ 452/163 |
| 7,044,847 B2 * | 5/2006 | Ketels ............... 452/162 |
| 7,252,584 B2 * | 8/2007 | Kragh ............... 452/163 |

FOREIGN PATENT DOCUMENTS

WO 2004/066740 A1 8/2004

* cited by examiner

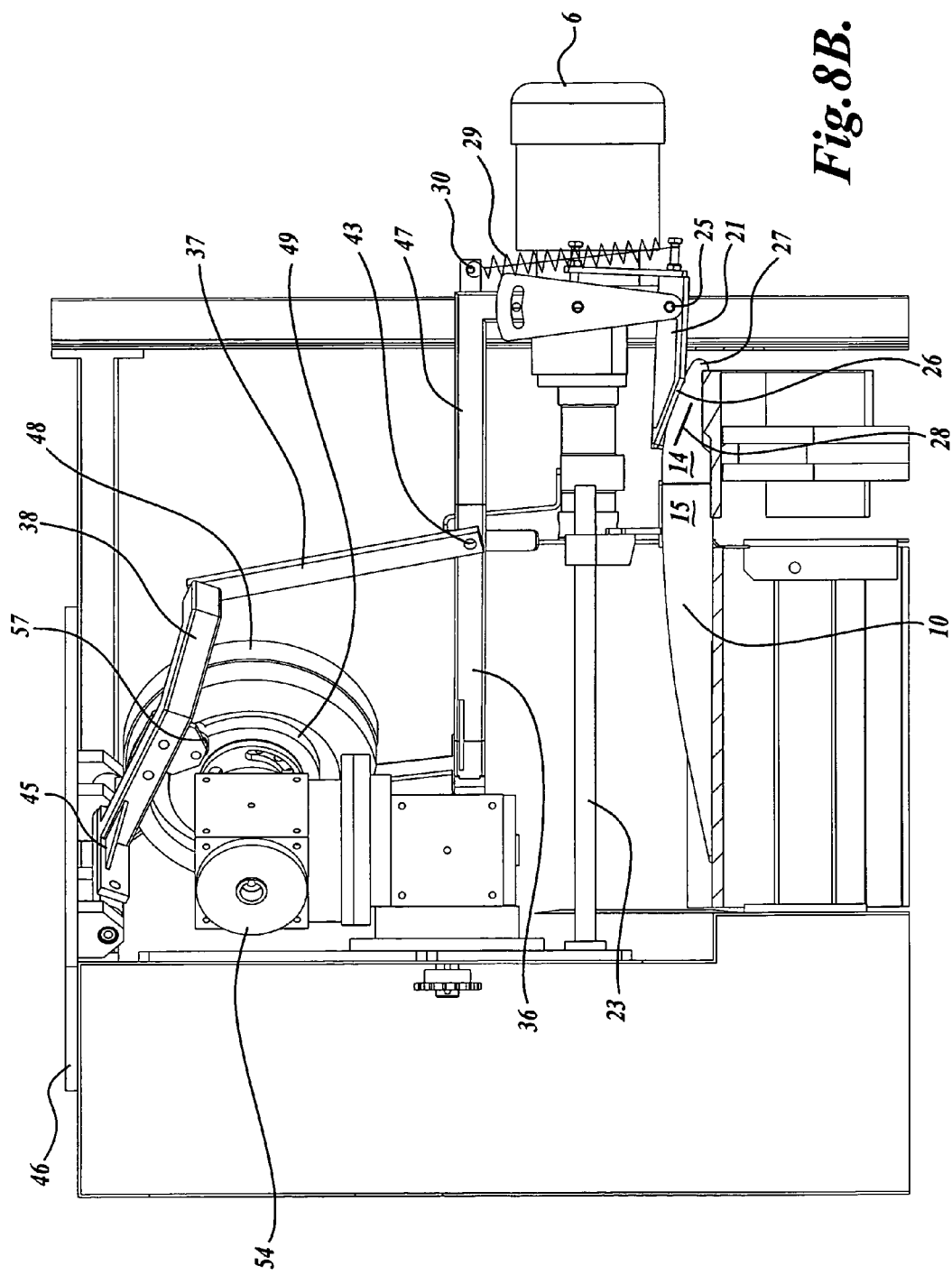

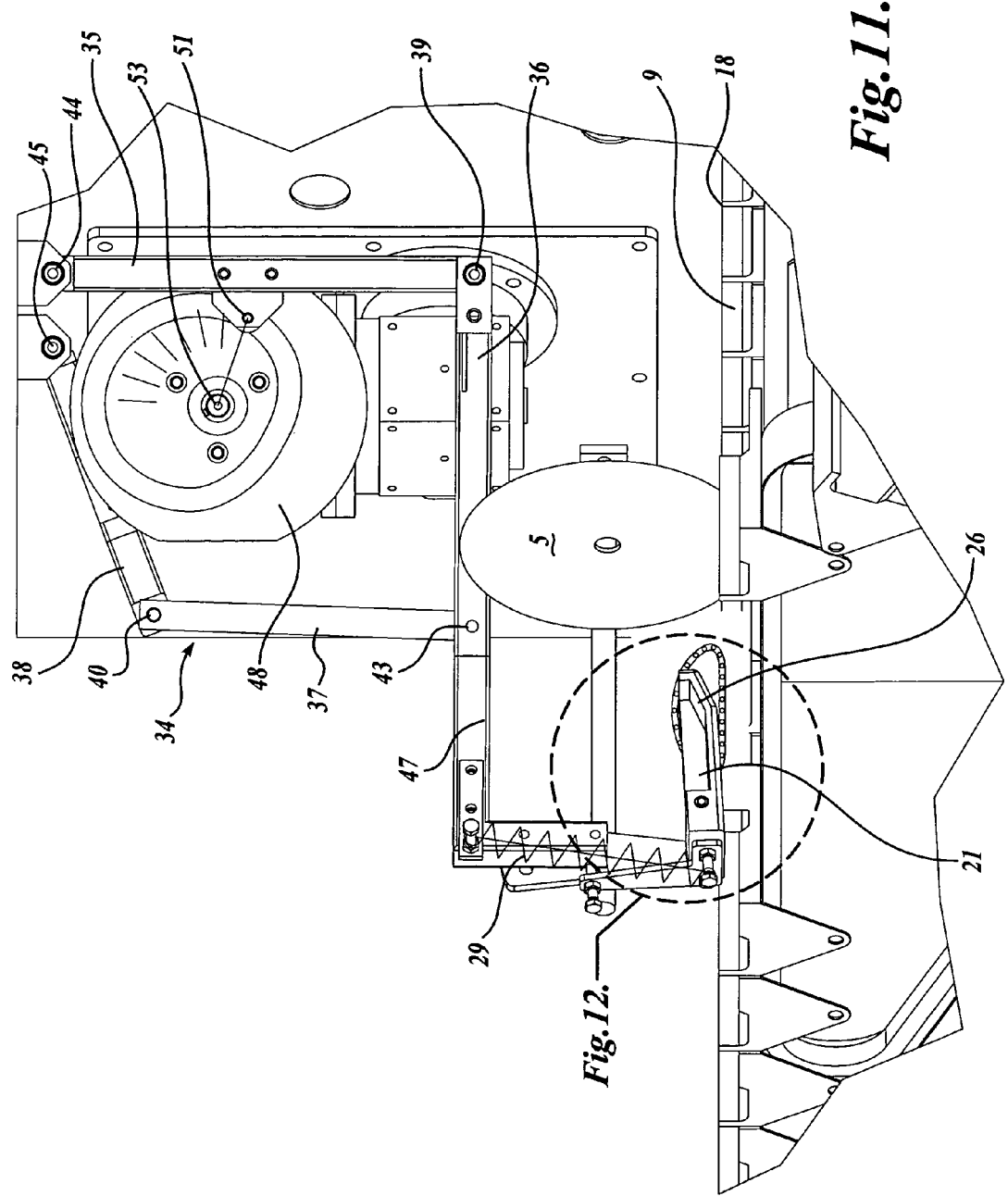

APPARATUS FOR POSITIONING FISH FOR HEADING

BACKGROUND

The present application relates to a method for cutting a fish head off a fish, i.e., heading a fish, and in particular, a method for orienting a fish in a heading machine for heading. The present application also relates to a device for orienting a fish in a heading machine, in which a blade suitable for heading a fish is provided.

An underlying issue of heading a fish using a heading machine is solving the problem of removing the entire fish head without removing usable fish meat from the fish body. An array of suggestions have been proposed regarding positioning the fish such that a blade plane spanned by a cutting blade runs precisely between the fish body and the fish head. For example, a suggestion has been made to create a form fit between a fish head and a positioning unit. Pointed objects, such as nails or needles, are attached to the positioning unit. These pointed objects penetrate into a thin flesh cover of the fish head. Through a comparatively complex displacement mechanism, with the aid of which a positioning unit is lowered in a direction toward the fish's head, the pointed objects are pressed into the flesh. In this manner, the fish is coupled to the positioning unit. The positioning unit must then be controlled in a constructively complex carousel unit so that the fish body is displaced in a trough in which it is conveyed in a direction toward the positioning unit and then transported out of it.

While the devices described above are capable of positioning a fish in the desired position such that the fish may be headed, these devices are very costly and therefore fail to consider the demands placed on modern fish processing machines.

SUMMARY

The following summary is provided to introduce a selection of concepts in a simplified form that are further described below in the Detailed Description. This summary is not intended to identify key features of the claimed subject matter, nor is it intended to be used to limit the scope of the claimed subject matter.

As described in the present application, a method and a device is presented that uses comparatively little operative outlay to precisely position a fish such that the fish may be headed along a desired cutting plane. In one embodiment, a method is disclosed that applies a displaceable pressure part to act on an area of the fish's head, thereby displacing the fish's head in a direction toward the fish's body. Yielding to this pressure, the fish is displaced into a position suitable for heading.

In another embodiment, a device is presented that utilizes a pressure part that may be lowered onto a rising area of the fish's head. The pressure part has a surface that is applied to the rising area of the fish's head. The fish is displaceable on a substrate as the pressure part is lowered.

Embodiments described herein advantageously dispense with the complex formfitting and coupling of the fish's head to a positioning unit, as previously described. Rather, the pressure part of the embodiments described herein utilizes the fact that a fish has a very smooth surface, both in regard to its shape as well as its scale covering with which the fish lies on a substrate. Through selectively applying pressure to a part of the fish, the fish moves in a desirable direction for positioning purposes. The fish is stopped in a position suitable for heading via the fish's fins or gills catching on device positioned proximate to the fish.

Through the use of a fish's natural composition, a comparatively light pressure part may be used for positioning the fish for heading. The pressure part may be controlled with the aid of a light control device to exert a pressure suitable for positioning the fish for heading. Moreover, the pressure part may be moved rapidly after executing a positioning procedure, such that it is again available in its starting position for positioning another fish.

In one embodiment, the pressure part is displaced in a vertical direction. Through this displacement in the vertical direction, relatively little space is required to position a fish. In addition, through the vertical displacement of the pressure part, an adequate pressure may be exerted on an appropriately formed area of the fish's head, resulting in desired positioning of the fish under the effect of the pressure.

The pressure part may also be displaced in a horizontal direction. By allowing horizontal displacement, the pressure part may follow the fish as it moves resulting from the pressure effect exerted on the fish's head until the fish has slipped into its final position.

The pressure part acts on the rising area of the fish's head using an inclined pressure surface. The incline of the pressure part corresponds approximately to that of the rising area of the fish's head. The inclined pressure surface, acting on the rising area of the fish's head, aids in proper displacement/positioning of the fish.

In one embodiment, the fish is placed in the heading machine lying in a lateral position. Pressure is exerted on an area of the fish's head which rises according to the lateral position of the fish. Through this lateral position, the fish is in a stable position as the pressure is exerted thereon, so that a secure introduction of the pressure on the appropriate area of the fish's head may be expected.

The fish is guided in a trough on which it is laid when it is placed on the heading machine. During the action of the pressure part, a side edge of the trough determines the displacement direction in which the fish is brought into the desired heading position.

The pressure part is applied to the fish in a direction toward the side edge of the trough. The edge, therefore, provides a solid support for guiding the fish into the desired heading position.

The pressure part is applied to the fish to move it in the direction toward the trough's side edge and also in the direction of the fish's tail. A fish is generally inclined both in a longitudinal direction and also transversely to the longitudinal direction of the fish such that pressure, in one or both directions may be applied to the fish. In one embodiment, the pressure surface of the pressure part is positioned diagonally to edges of the pressure part, in which the pressure surface is inclined not only in the longitudinal direction of the fish body, but also transversely to the longitudinal direction of the fish body. In this arrangement, when the pressure part is lowered toward the fish body, the pressure part influences the fish body both in its longitudinal direction and also transversely to its longitudinal direction.

Because the pressure surface of the pressure part is inclined in two directions, it acts to displace the fish both in the longitudinal direction of the fish and also transversely to the longitudinal direction of the fish. By selecting an appropriate area of the fish body to which pressure is applied when the pressure part is lowered, the fish is displaced into the desired heading position, even when slight pressure is applied.

As previously noted, the fish is pressed by the pressure part against a side edge delimiting a trough, in which the fish is laid for the purpose of heading. The trough defines the direction that the fish is displaced/positioned, such that the fish lying in the trough is oriented in relation to the cutting plane for heading.

The fish may be stopped during displacement/positioning by a braking device which, in one embodiment, engages the fish under a lateral fin. Braking devices that engage a lateral fin are useful to adequately position of the fish for heading.

The pressure part may be controlled by a four-bar chain. A four-bar chain is capable of performing control procedures in multiple planes. In addition, it is comparatively light and may be easily controlled by disk cams.

As will be described further in the Detailed Description below, a first part of a four-bar chain which controls horizontal movement of the pressure part may be connected via a coupling joint to a second part of the four-bar chain which controls vertical movements of the pressure part. The control in the horizontal and vertical planes may be performed easily and securely with the aid of the four-bar chain.

The first and second parts of the four-bar chain can be mounted independently of one another in pivot joints, each of which is attached to a support. In this way, the four-bar chain receives a secure suspension which allows reliable continuous operation of the entire device.

The first and second parts of the four-bar chain may each be pivoted around pivot axes of the pivot joints, which can run in vertical planes parallel to one another, of which each may run at an angle of 40 to 70° to a vertical plane spanned by the trough edge. Thus, the four-bar chain is operated in a position pivoted in relation to the trough edge. Through this pivoting of the four-bar chain and the distribution of the pivot bearings provided in the four-bar chain, a guide curve to be executed by the pressure part may have its course influenced to a wide extent. During execution of an operating cycle, it is desirable to guide the pressure part along a guide curve in which the pressure part is guided with angular velocities that are as constant as possible.

In one embodiment, the vertical planes spanned by the pivot axes may run at an angle of 50 to 60° to the vertical plane spanned by the trough edge. With an arrangement of a four-bar chain of this type, a guide curve results whose planar component passes harmonically into a curved component.

The pressure part may be guided by the four-bar chain at a constant distance from the trough edge. In this way, during positioning the fish only has forces applied to it in the displacement direction.

In one embodiment, the pressure part may be guided at a distance of 10 to 40 mm parallel to the edge. This distance of 10 to 40 mm may help avoid deformation of the fish even under the influence of forces acting transversely to the displacement/positioning direction.

In another embodiment, the four-bar chain is controlled by disk cams. A controller of this type has an advantage that control curves may be situated on the disk cams, with the aid of which the control procedure may largely be influenced in a predefined way, for example, to have the most uniform possible angular velocities.

Still further, the four-bar chain may be moved by an external control curve of the disk cam to control the horizontal movements of the pressure part.

The four-bar chain may be moved by an internal control curve of the disk cam to control the vertical movements of the pressure part. In this way, different control curves can be situated in one disk cam, so that all movements of the four-bar chain may be controlled by a single disk cam.

As previously noted, in one embodiment, the pressure part is controlled in the direction of the trough edge and transversely to the direction of the edge by an internal and external control curve. Through these uniform control curves, the constructive complexity for executing the control in the horizontal plane may be kept small.

The control movements of the disk cam may be transmitted to the four-bar chain by cams guided on the control curves. These cams allow sensitive scanning of the control curve, so that even sensitive parts of a control curve, for example, upon the transition from the planar part of the control curve to its curved part, may be traveled precisely.

In this particular embodiment, the four-bar chain is lowered by its second part in the direction toward the fish body, and the pressure part is pressed thereon by an extension spring. Thus, with the aid of the extension spring, an approximately constant contact pressure force is exerted on the fish, largely independently of its dimensions.

The pressure part is provided on an angled end, running parallel to the trough edge, of a lower strut of the four-bar chain running in a horizontal direction. Through this parallel orientation of the angled end to the edge, a parallel guide of the pressure part along the edge may be ensured, although this edge may be moved during the orientation of the fish as a conveyance device on which the troughs are situated moves the troughs in a conveyance direction.

An action center of the pressure part applied to the fish's head may be moved on a guide curve which runs in a plane in a lowered state of the pressure part and runs curved in a raised state of the pressure part. Such a guide curve allows nearly uniform distribution of the angular velocities of the pressure part over the entire course of the guide curve. Insignificantly increased angular velocities may arise in the curved part of the guide curve in relation to the planar course of the guide curve. The difference of the angular velocities is generally slight, however, so that significant accelerations and/or delays do not occur in the area of the control elements, such as the control cam. Rather, the angular velocities may rise upon the transition from the planar area of the guide curve into the curved part and increase approximately up to the middle of the curved part. The angular velocities are then reduced again in the direction toward the deflection of the guide curve in the direction toward the planar part, in which the angular velocities are constant.

The disk cam may be mounted on a drive axis that runs parallel to the pivot axes of the pivot joint. In this way, the cams guided on the control curves of the disk cam may sensitively scan the control curve without forces acting on the control curves that are greater in some areas than others.

In a device for orienting a fish body in a heading machine, in which a blade suitable for cutting a fish head off of a fish body is provided, the control curves on one side and the four-bar chain on the other side may run in first set of planes that are parallel to one another, and which run diagonally to a second set of planes plane spanned by the edge of the trough. Through these planes running diagonally to one another, it is possible to determine a guide curve for the pressure part in which the angular velocities of the pressure part are distributed largely uniformly over the entire guide curve.

The pressure part may have a higher conveyance speed in the area of the curved part of the guide curve than in the planar part of the guide curve. The particular velocity is controlled in accordance with an arrangement of pivot joints in the four-bar chain in the diagonal position of the two planes to one another. In this way, the individual variables that influence the guide curve are set sensitively, which ensures that high accelerations of the pressure part in the area of the guide curve are generally avoided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 shows an enlarged view of a controller transverse to the plane spanned by the four-bar chain.

DETAILED DESCRIPTION

Figure 1:
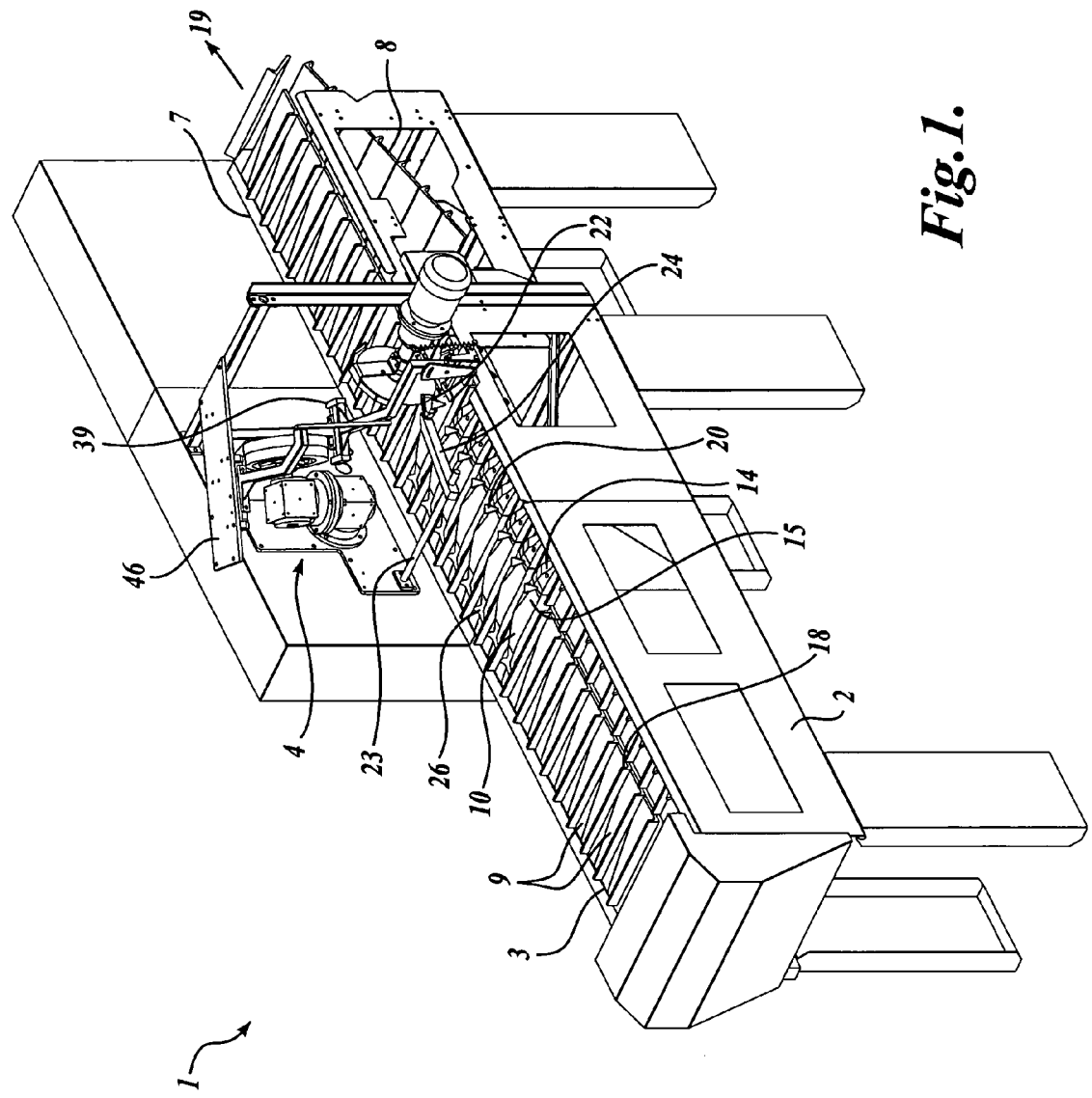
FIG. 1 shows a perspective illustration of a fish heading machine.
Figure 2:
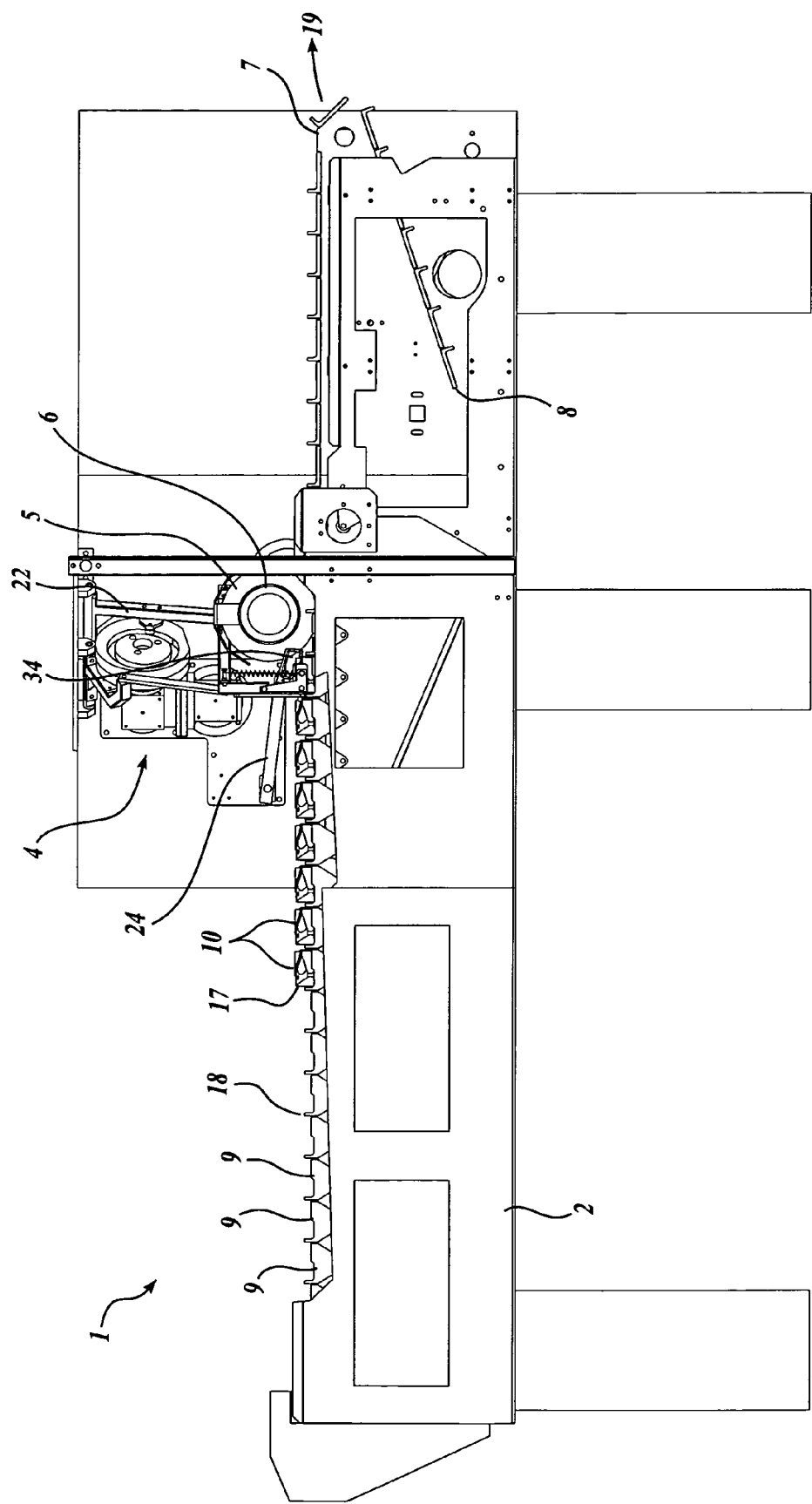
FIG. 2 shows a front-side view of the fish heading machine.
Figure 3:
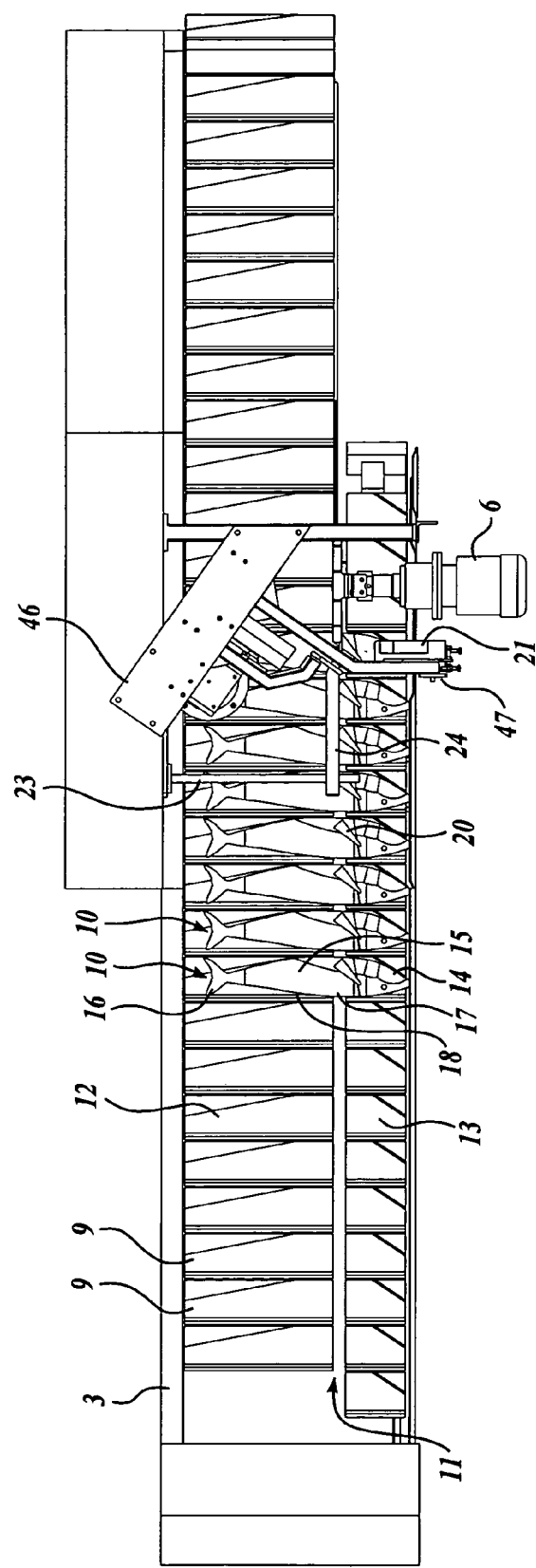
FIG. 3 shows a top view of the fish heading machine.
Figure 4:
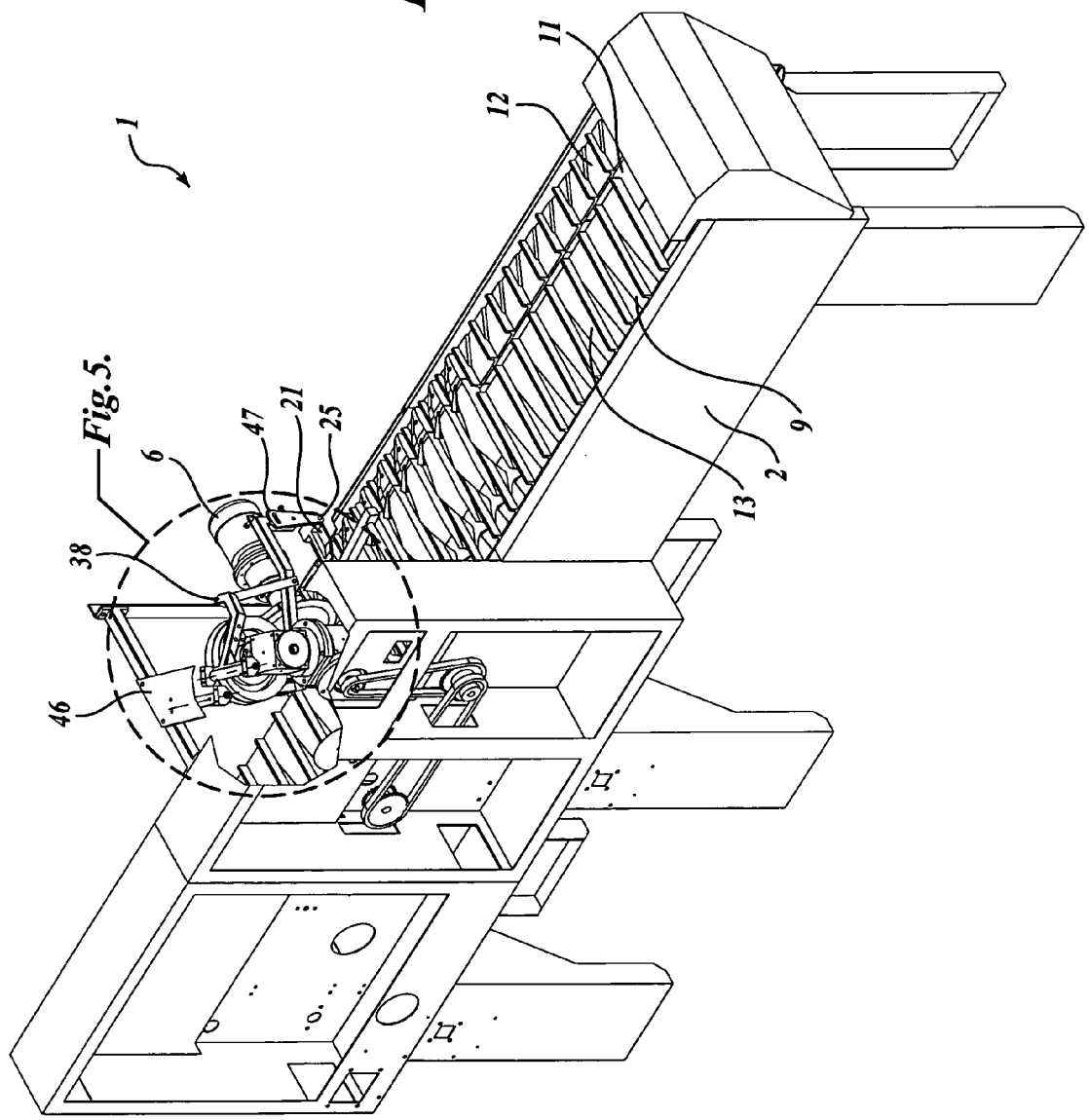
FIG. 4 shows a rear view of the fish heading machine in a perspective illustration.
Figure 5:
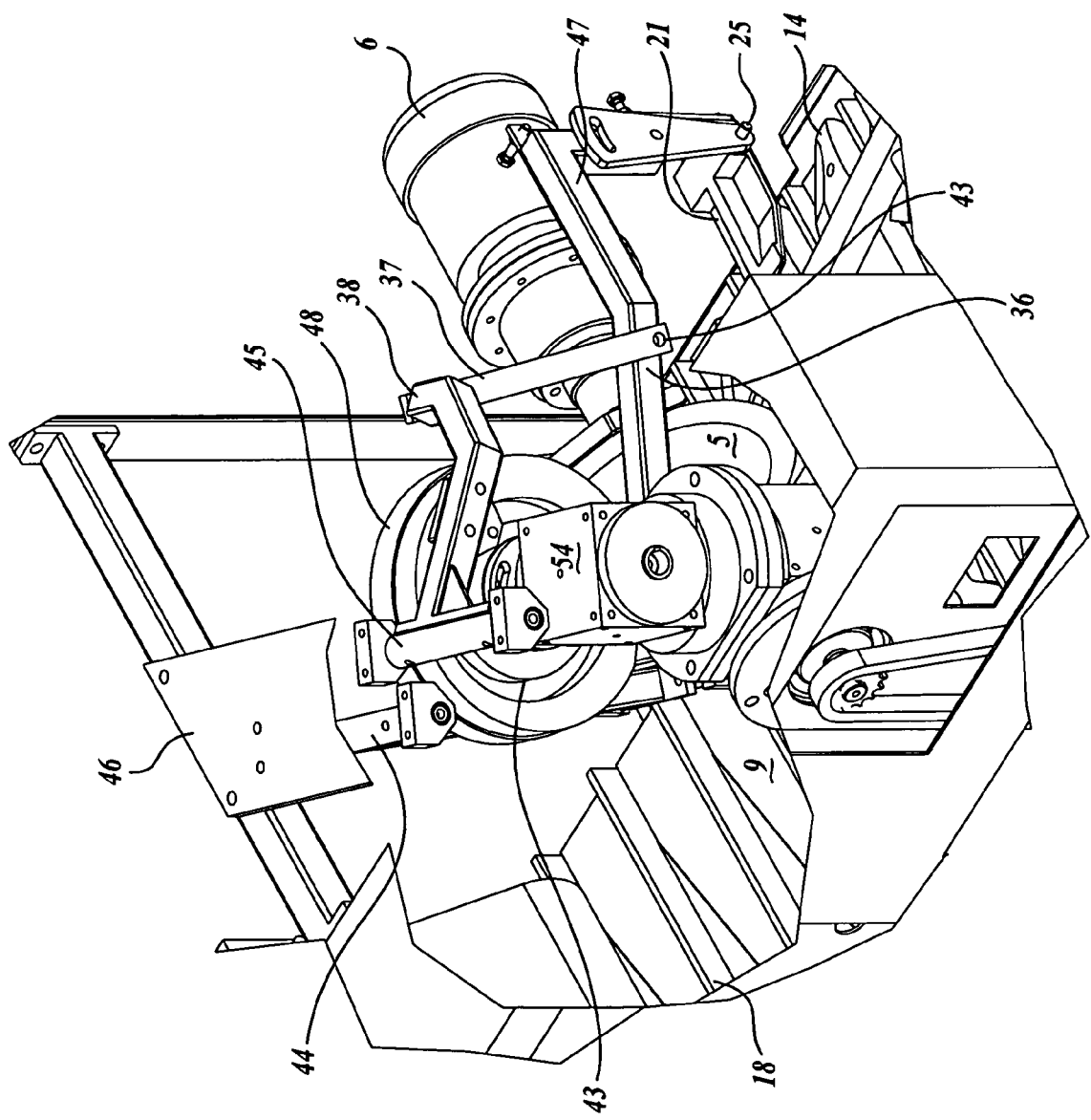
FIG. 5 shows an enlarged illustration of a control unit corresponding to a detail area identified in FIG. 4.
Figure 6:
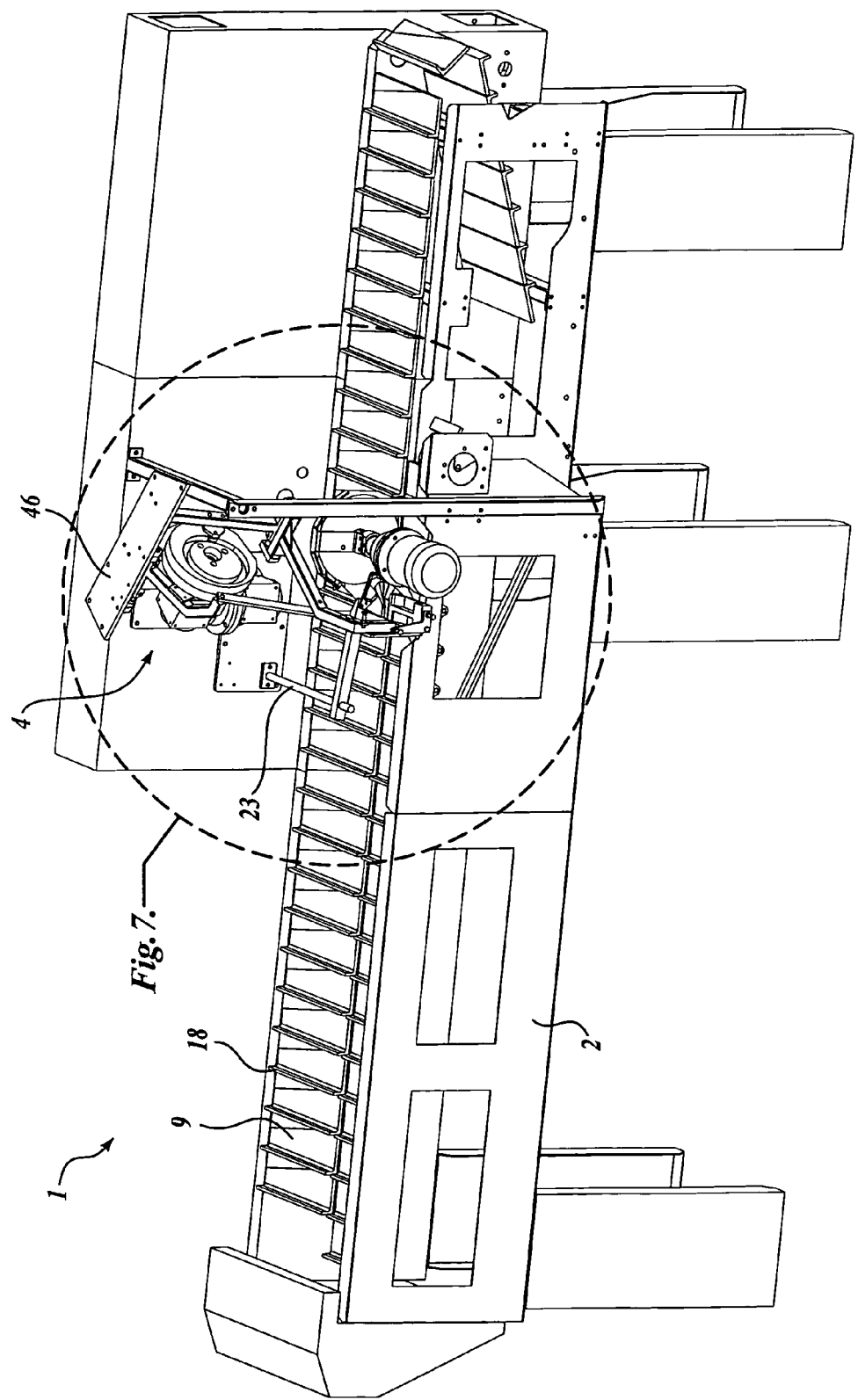
FIG. 6 shows a side view of the fish heading machine.
Figure 7:
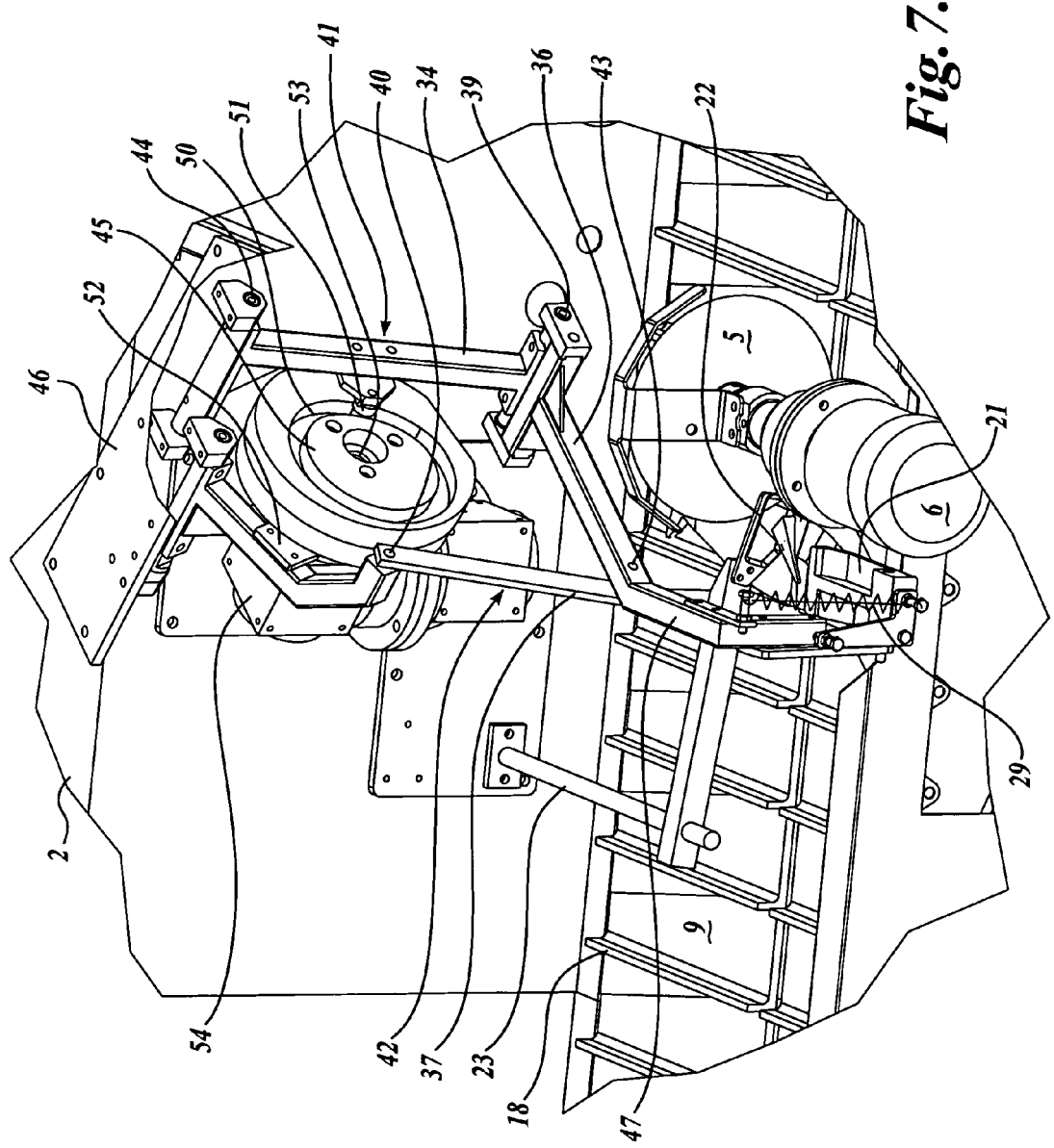
FIG. 7 shows an enlargement of the control device corresponding to a detail area identified in FIG. 6, FIGS. 8A and 8B show cross-sections of the fish heading machine.
Figure 8A:
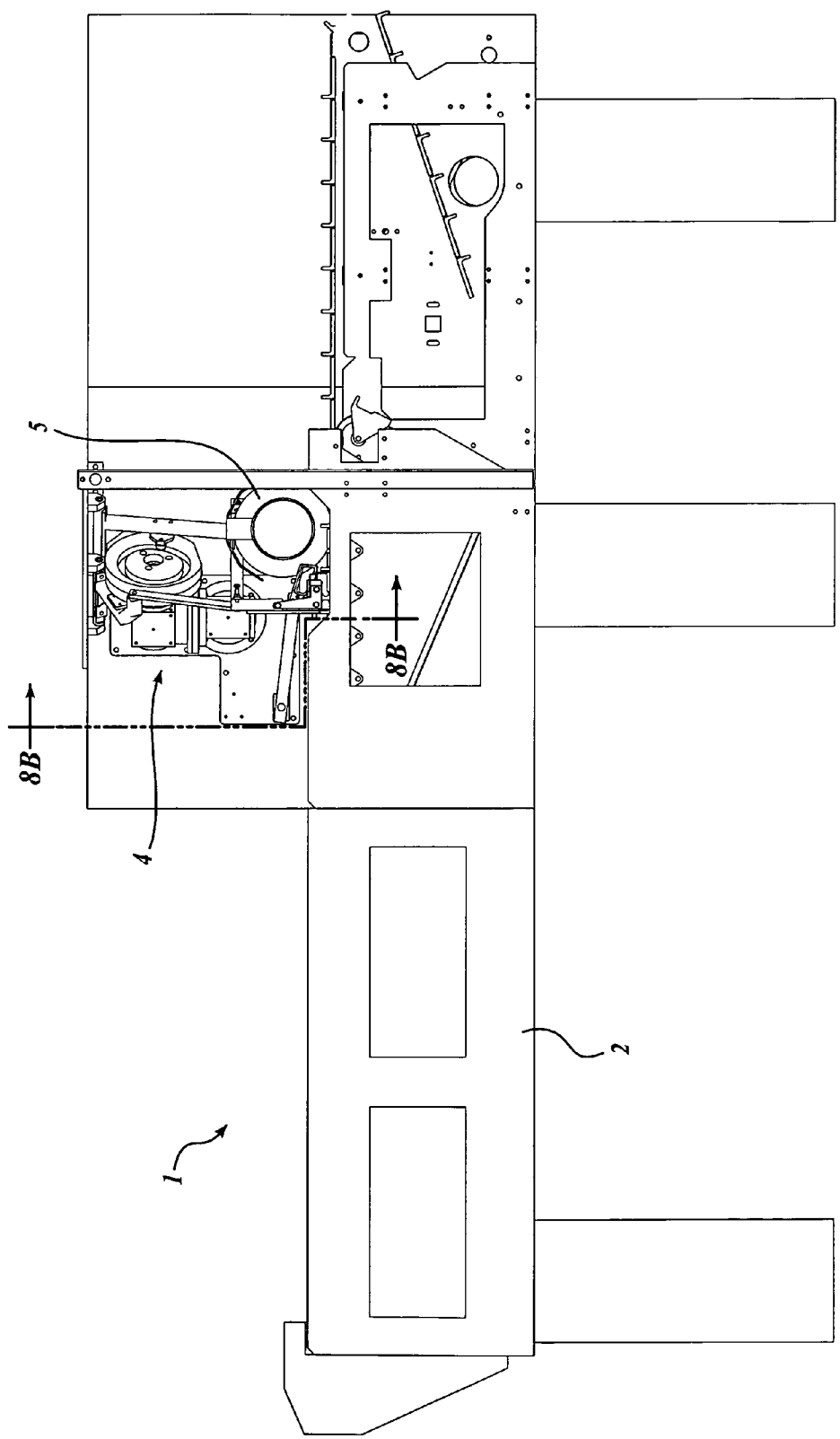
Figure 9:
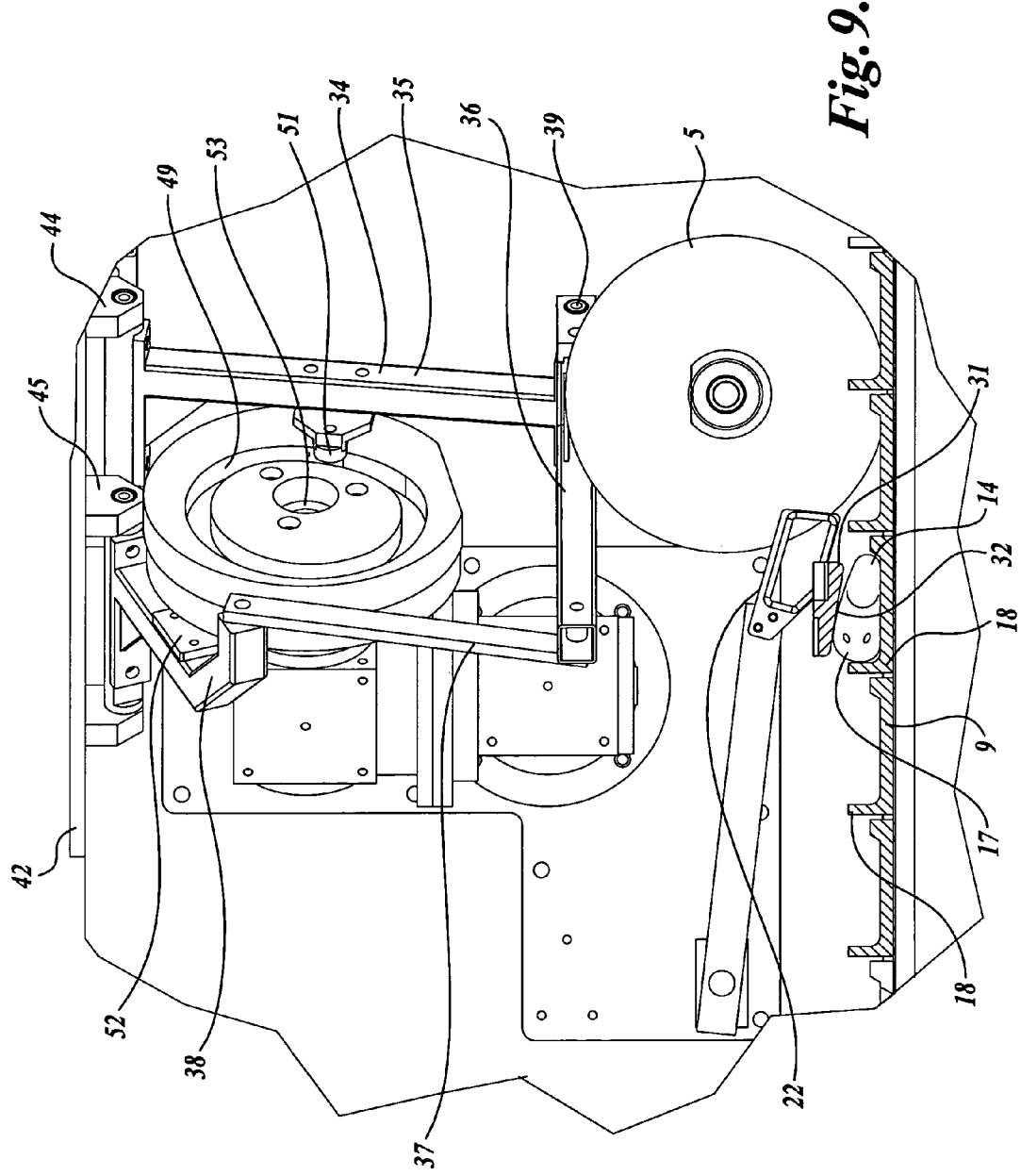
FIG. 9 shows an enlarged view of the fish heading machine in the area of the controller.
Figure 10A:
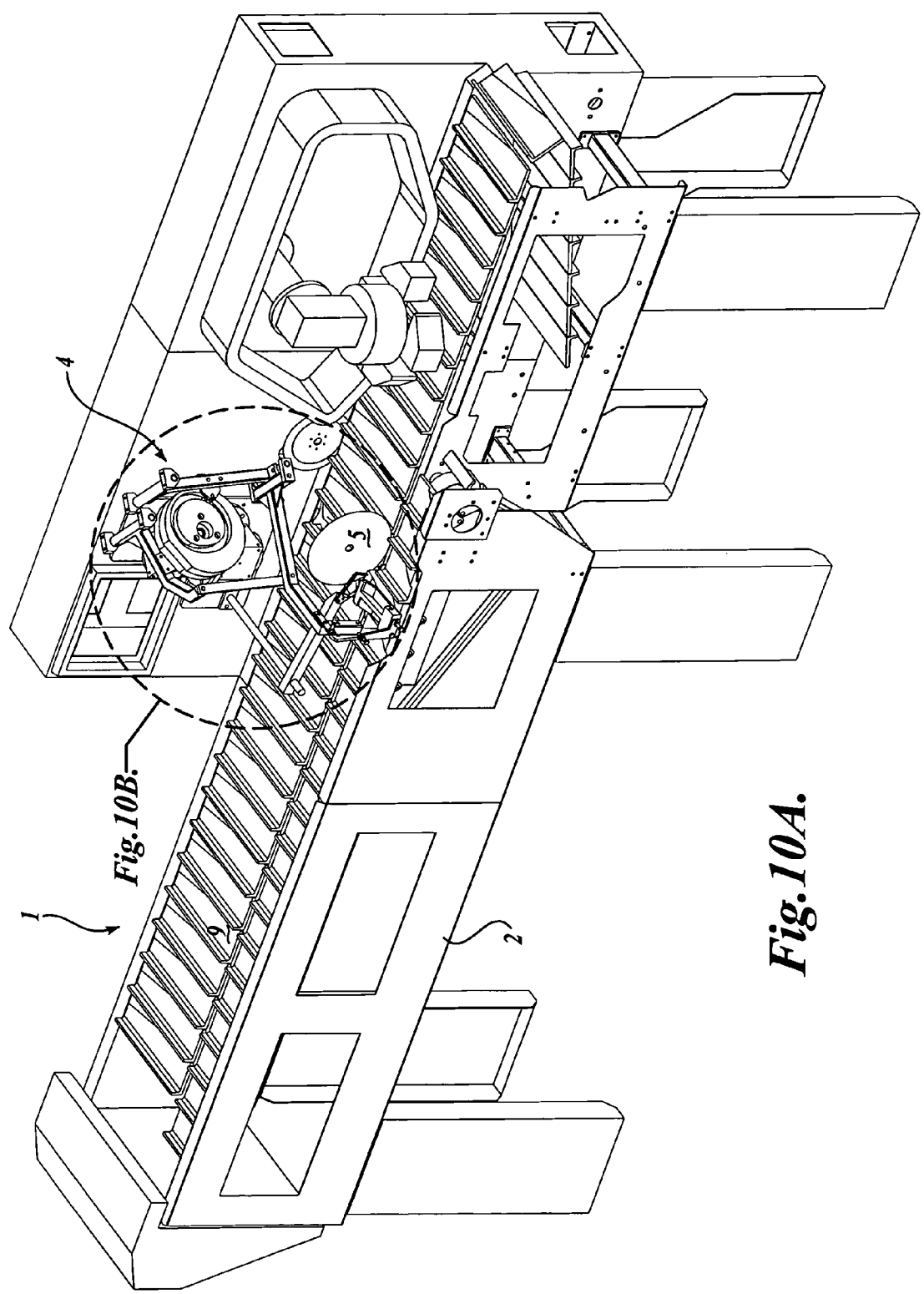
FIGS. 10A and 10B show perspective illustrations of a controller in the direction of a drive axis which drives the disk cams.
Figure 10B:
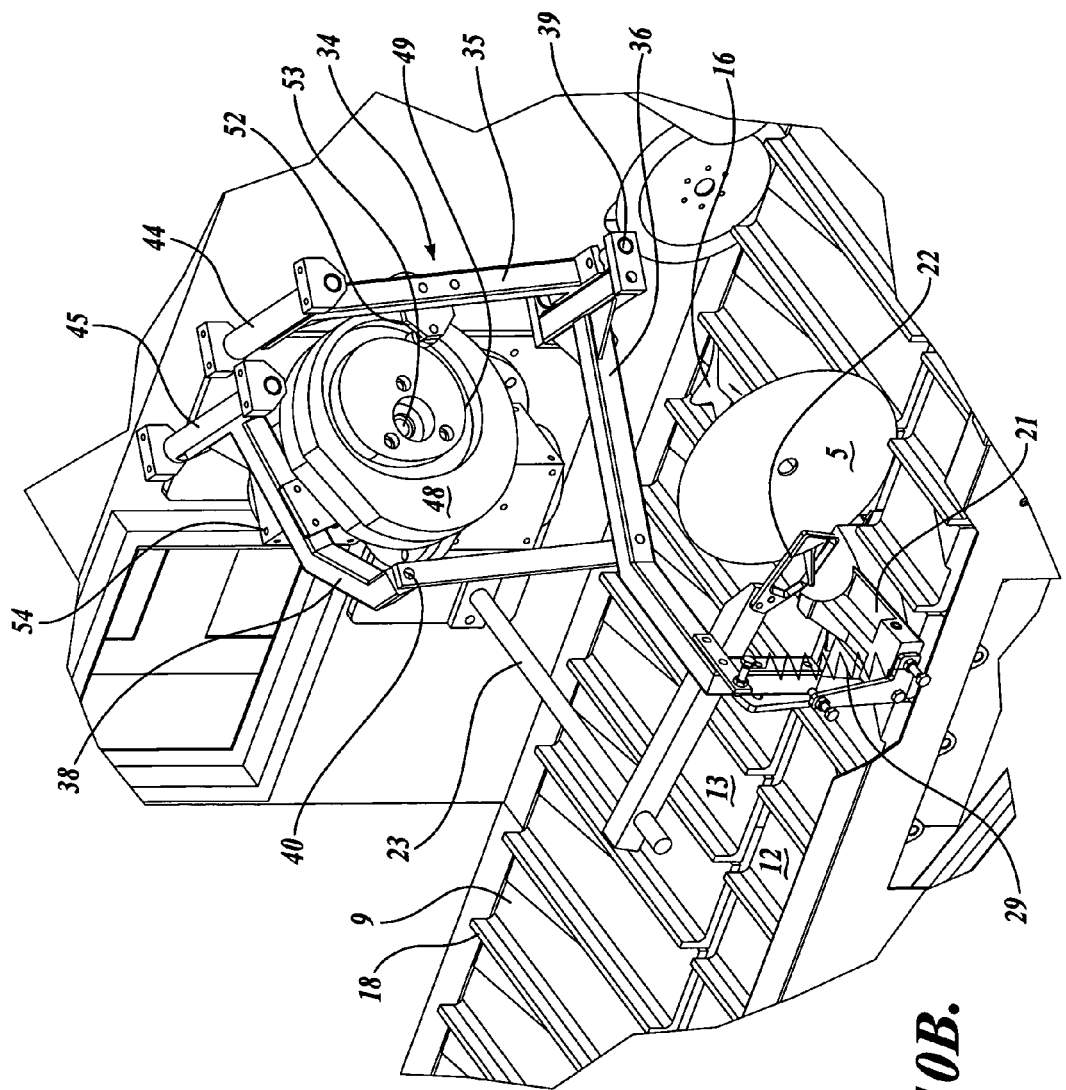
Figure 12:
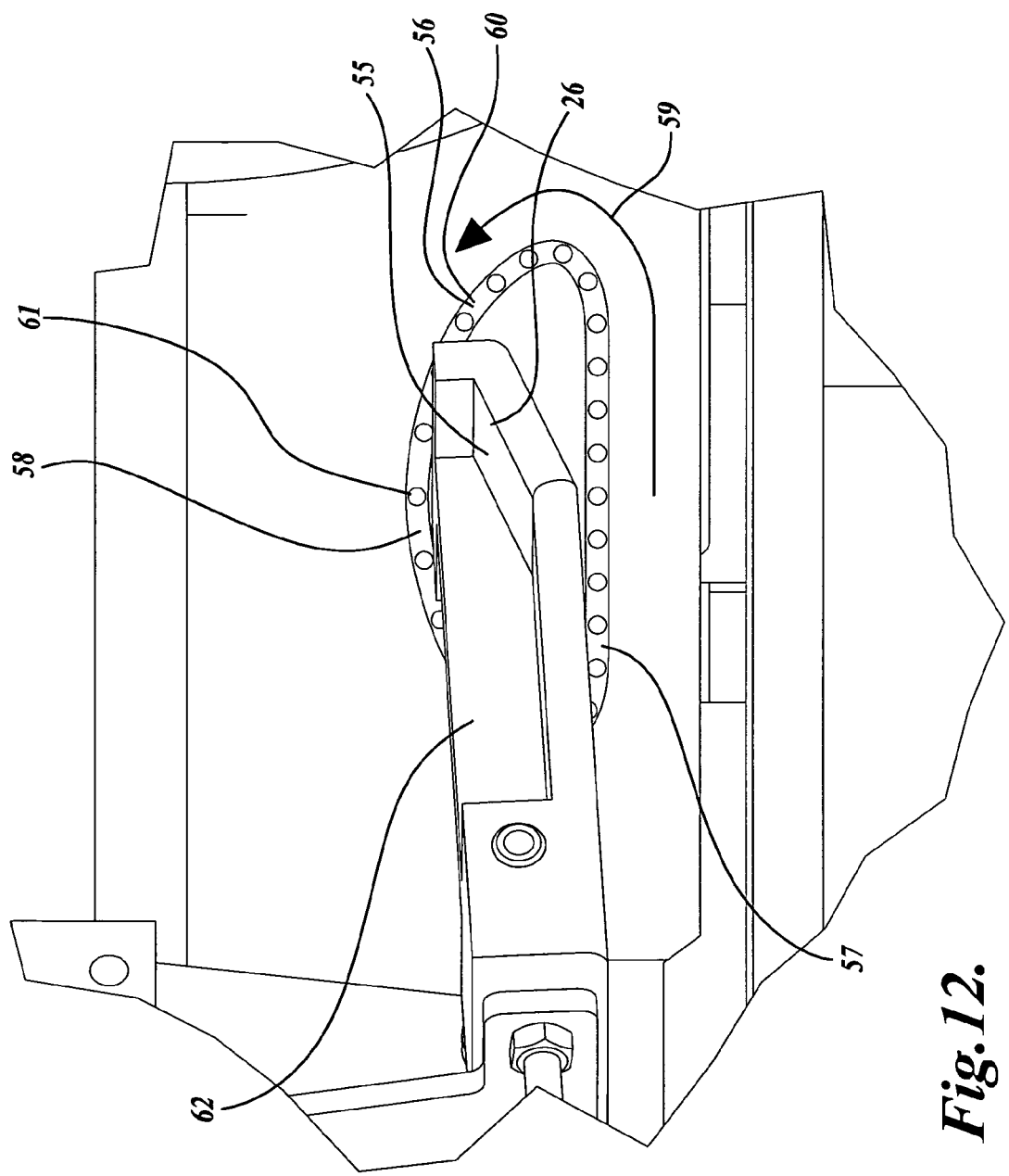
FIG. 12 shows a further enlarged view of a detail area identified in FIG. 11 of a guide curve to be executed by the pressure part.

As shown in FIGS. 1-12, a fish heading machine 1 comprises a machine frame 2, a conveyor 3, a control device 4, and a cutting blade 5 which is driven by drive 6. The conveyor 3, having an upper belt 7 and a lower belt 8, is guided in the machine frame 2. Troughs 9, in which fish 10 are placed for heading, are attached to the conveyor neighboring one another. As shown, each trough 9 is divided by a partition line 11 into a head receptacle 12 and a carcass receptacle 13. The fish's head 14 lies in the head receptacle 12, while a fish's body 15 rests in the carcass receptacle 13 on the other side of the partition line 11. The fish's tail 16 adjoins the fish's body 15 in the longitudinal direction of the fish 10.

Each fish 10 rests on its side in such a way that its back 17 presses against an edge 18 delimiting the trough 9. More particularly, the edge 18 delimits the trough 9 transversely to a conveyance direction 19 of the conveyor 3, with the edge 18 delineating the rear of the trough 9 in respect to the conveyor direction 19.

The cutting blade 5 is implemented as a circular blade driven by the drive 6, and is situated in a plane spanned by the partition line 11. A fish's head 14 is cut off of the fish body 10 with the aid of this cutting blade 5. For this purpose, a fish 10 is oriented within a trough 9 in such a way that the fish's head 14 is cut off of the fish's body 15 at a point which lies directly in front of a fin 20 on the fish's body. For orientation, the fish 10 is moved with the trough 9 by application of pressure from a pressure part 21 until the fin 20 catches in a braking device 22, which is attached to a lever 24 pivotable around a transverse axis 23. This lever 24 extends above the fish 10 in the conveyor direction 19.

The pressure part 21 is implemented as a two-arm lever mounted so it is pivotable around a pivot point 25. The pressure part 21 includes a pressure surface 26 that is applied to an area 27 of the fish's head 14 rising in the direction toward the fish's body 15. For this purpose, the pressure surface 26 is provided with a first incline 28. This first incline essentially corresponds to the incline of the rising area 27 of the fish's head.

Pressure is exerted by the pressure surface 26 on the rising area 27 of the fish's head 14. The pressure surface 26 is dimensioned as sufficiently large to displace the fish 10 in its trough 9 in the direction toward the fish's tail 16. The pressure applied by the pressure surface 26 is generated with the aid of an extension spring 29, which pulls the pressure part 21, implemented as a dual-arm lever, on the other side of the pivot point 25 in the direction toward a coupling point 30 and, at the same time, presses the pressure surface 26 downward onto the rising area 27 of the fish's head 14.

To orient the fish 10 along the edge 18, the pressure surface 26 also has, in addition to the first incline 28 tailored to the fish head's rising area 27, a second incline 31, which is applied to an area 32 of the fish's head 14, the second incline 31 rising transversely to the longitudinal axis of the fish 10. Through this second incline 31 of the pressure surface 26, the fish 10 is impinged in the direction toward the edge 18, against which the back 17 of the fish 10 presses. In this way, the fish 10 is displaced in the direction toward its tail 16 because of the pressure along the edge 18 exerted by the first incline 28. The fish's movement within the trough 9 ends when the fish's fin 20 is caught within the braking device 22 which halts the movement of the fish 10.

Once positioned by applying pressure on the fish 10 with the pressure surface 26, the fish 10, lying in the trough 9, is transported by the conveyor 3 in the direction 19 toward the cutting blade 5, which cuts the fish's head 14 off of the fish's body 15 in the area of the partition line 11. While the fish's head 14 falls out of the head receptacle 12 into a collection container (not shown) after it is cut off, the fish's body 15 is transported further in its trough 9 until it falls out of the trough upon the deflection of the upper belt 7 in the direction toward the lower belt 8 and is also collected in a container (not shown).

During the conveyance of the fish 10 in the direction toward the cutting blade 5, the pressure part 21 may track the moving fish. In this case, the fish 10 moves both in the conveyor direction 19 of the conveyor 3 and also within its trough 9. These movements of the fish 10 occurring in the horizontal plane should be tracked by the pressure part 21. In addition, the pressure part 21 should also be deflected in this movement direction as soon as the fish 10 has reached the cutting blade 5 and is adjusted thereby into its particular position. In this instant, the pressure part 21 is raised in the vertical direction from the fish 10 under the cutting blade 5, and is moved backward against the conveyor direction 19 of the conveyor 3 to the following trough 9. There, the above sequence is repeated: the pressure part 21 is lowered onto the head 14 of the fish 10 lying in the trough 9; pressure is applied to the fish 10 via the pressure part 21 such that the fish 10 is positioned for heading; and the fish 10 is transported to the cutting blade 5. Positioning the fish 10 ends as soon as the fish, lying in the trough 9, has reached the cutting blade 5.

The pressure part 21 is controlled by a four-bar chain 34. This four-bar chain 34 essentially comprises struts 35, 36, 37, and 38, each two of which are connected to one another via joints 39 and 40. In this case, the two struts 35, 36 form a first part 41 of the four-bar chain 34, connected via pivot joint 39. Struts 37, 38 form a second part 42 of the four-bar chain 34, connected via pivot joint 40. The first part 41 is connected to the second part 42 via a coupling joint 43.

The first part 41 is mounted in a pivot joint 44 so it is pivotable, while the second part is mounted in a second pivot joint 45 so it is pivotable. The first pivot joint 44 and the second pivot joint 45 are attached to a support 46, which is connected to the machine frame 42.

The strut 36 of the first part 41 of the four-bar chain 34 executes movements in the horizontal plane, while the strut 37 of the second part 42 executes movements in the vertical direction. If horizontal movements executed by the strut 36 are superimposed on vertical movements transmitted by the strut 37, movement sequences both in the horizontal and also in the vertical planes arise in an angled end 47 of the four-bar chain 34 attached to the strut 36. In this case, the movements are controlled both in the vertical and also in the horizontal plane by a disk cam 48, in which an internal control curve 49 and an external control curve 50 are impressed. The external control curve 50 is connected via a first control cam 51 to the strut 35 of the first part 41, so that the strut 34 follows the movements which the control cam 51 scans on the outer control curve 50.

In a similar way, a control cam 52 connected to the strut 38 of the second part 42 is guided on the internal control curve 49. The control cam 52 and thus also the strut 38 are raised or lowered in accordance with this internal control curve 49. Therefore, the angled end 47 of the strut 36 is also raised or lowered in the same rhythm. The rhythm of the raising and lowering and also the rhythm of the movements of the first part 41 in the horizontal direction are predefined in this case by the speed of the disk cam 48. This is mounted on a drive axis 53 so it is rotatable. The control curves 49, 50 are also defined in relation to this drive axis 53. The disk cam 58 is driven by a gear 54, which is synchronized with a drive (not shown) of the conveyor 3, so that the movements of the angled end 47 controlled by the control curves 49, 50 are tailored to the movements of the troughs 9 on the conveyor 3. In this case, a guide curve 56, on which an active point 55 and therefore the entire pressure part 21 may be guided at the most uniform possible angular velocities, is desired for the pressure part 21 and/or the active point 55 assumed in the pressure surface 36. This guide curve has a planar part 57, along which the pressure part 21 is guided in the lowered state and is applied to an appropriate area 27, 32 of the fish 10.

A curved part 58 of the guide curve 56 rises above the planar part 57, along which the pressure part 21 is guided back again to a fish 10 lying in the next trough 9. The pressure part 21 is then lowered again to this fish 10 lying in the following trough 9, so that it is applied to the fish 10 lying in this trough 9 along the planar part 57 in a position in which the fish's head 14 may be cut off of the fish's body 15. In this case, the guide curve 56 is guided in a counterclockwise rotational direction 59 on the guide curve 56. The pressure part 21 tracks the fish 10 lying in the trough 9 in the conveyor direction 19 of the conveyor 3 and the fish 10 is displaced simultaneously both in its longitudinal direction in the direction toward its tail part 16 and also transversely to its longitudinal direction in the direction toward the edge 18.

After the fish 10 has arrived in the area of the cutting blade 54, the pressure part 21 is raised by lifting the pressure surface 26 from the fish 10, and is simultaneously displaced along the curved part 58 in the direction toward a fish 10 lying in a following trough 9. In this case, due to the shape of the guide curve 56, the pressure part 21 is transported along this guide curve 56 at an essentially uniform angular velocity, so that slight accelerations only occur in a rising part 60 of the guide curve up to its uppermost point 61, and delays during transport of the pressure part 21 occur in an adjoining falling part 62 up to the reentry into the planar part 57 of the guide curve.

The control procedures in the area of the four-bar chain 34 also occur in accordance with this largely uniform distribution of angular velocities within the guide curve 56, so that as the control curves 49, 50 are traveled by the control cams 51, 52 in the individual phases which the pressure part 21 passes through, only slight accelerations or delays occur. The wear of both the control cams 51 and 52, and the control curves 49 and 50, is thus held in narrow limits and is largely negligible if appropriate materials are selected.

The guide curve 56 results on the basis of an array of constructive measures which are tailored to one another. Thus, for example, the pivot movements of the struts 35, 36, 37, and 38 run in planes which are plane parallel to one another, and which run at an angle of 40 to 70° to a plane spanned by the edge 18. The control curves 49, 50 and therefore also the movements of the control cams 51 and 52 also run plane parallel to the pivot planes of the struts 35, 36, 37, and 38.

The axes at the pivot joint 44 and 45 run perpendicularly to these pivot planes in which the struts 35, 36, 37, and 38 are pivoted, which thus run parallel to the drive axis 53 of the disk cam. In addition, the axes of the joints 39, 40, and 43 also run parallel to these axes.

The angled part 47 is angled in relation to the strut 36 in a direction which runs parallel to the edge 18. The pressure part 21 connected to the angled part 47 is thus guided parallel to the trough 9 by the pivot movements which the first part 41 of the four-bar chain 34 executes. Through the synchronization of the movements in the area of the disk cam 48 with the movements of the trough 9 in the conveyor direction 19, the pressure part 21 acts in the planar part 57 of the guide curve on the fish 10 lying in the trough 9 using the pressure already described, and thus positions the fish 10 within the trough 9 during this action time in such a way that the cutting blade 5 may cut the fish's head 14 off of the fish's body 15.

While the cutting blade 5 cuts the fish's head 14 off of the fish's body 15, the pressure part 21 is transported back to the head of the fish 10 lying in the following trough 9 as the angled part 47 is simultaneously pivoted back and raised.

The guide curve 56 is predefined by the implementation of the individual struts 35, 36, 37, and 38. The lengths of the individual struts 35, 36, 37, and 38 lying between the individual joins 44, 39, 43, 40, and 45 also particularly play a decisive role.

The orientation of a fish 10 for the purpose of heading with the aid of a cutting blade 5 is represented as follows.

A fish 10 is laid into one of the troughs 9 which are moved by the conveyor 3 in the conveyor direction 19 in such a way that the fish's body 15 lies in the carcass receptacle 13 and the fish's head 14 lies in the head receptacle 12. The fish 10 lying in the trough 9 is then transported in the direction toward the cutting blade 5. At the same time, the pressure surface 26 of the pressure part 21 is lowered to the rising area 27 and 32 of the head part 14. This pressure surface 26 has a first inclination 28 for exerting a pressure in the longitudinal direction of the fish 10 and a second inclination 31 transverse to the longitudinal axis of the fish 10. The pressure surface 26, which runs diagonally to the main axes of the pressure part 21, is applied to an area of the fish's head 14 which is also inclined to the fish's longitudinal axis and also inclined transversely to the fish's longitudinal axis.

By lowering the pressure surface 26 onto the corresponding area of the fish's head 14, a force is exerted on the fish 10 under which the fish 10 is displaced both in the direction of the longitudinal axis of the trough 9 and also transversely to its longitudinal axis. In this case, the fish 10 presses against the edge 18 of the trough 9.

The pressure part 21 tracks the movements of the trough 9 as it is conveyed on the conveyor 3. For this purpose, the pressure part 21 is attached to the angled end 47 of the four-bar chain 34. This four-bar chain 34 is driven by two control cams 51 and 52 guided on control curves 49 and 50 of the disk cam 48, one of which is connected to the first part 41 of the four-bar chain 34 and the second of which is connected to the second part 42 of the four-bar chain 34. The disk cam 48 is driven in synchronization with the conveyor 3, so that the pressure part 21 tracks each trough 9 moved by the conveyor 3 and is returned again to the following trough 9 after reaching the cutting blade 5. The guide curve 56 assists the tracking and return to a following trough 9 using a planar part 57 and a curved part 58. In accordance with the planar part 57, the pressure part 21 is conveyed parallel to the edge 18 in its lowered state, so that it is applied to the fish 10 in the area of the planar part 57. After reaching the cutting blade 5, the pressure part 21 is raised from the fish 10 and transported to the fish's head 14 lying in the following trough 9. In this case, the pressure part 21 maintains largely uniform angular velocities both in the planar part 57 and also in the curved part 58.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for heading fish in a heading machine, the method comprising:
   orienting a fish to be headed in relation to a cutting plane;
   applying pressure to a rising area of the head of the fish via a pressure part that slidably contacts the surface of the fish such that the fish is displaced in a direction toward the fish's body, thereby positioning the fish for heading; and
   heading the fish.

2. The method of claim 1, wherein the pressure part is applied to the rising area of the fish's head in a vertical direction.

3. The method of claim 2, wherein the pressure part further moves in a horizontal direction.

4. The method of claim 1, wherein the pressure part comprises an inclined pressure surface having a slope that corresponds approximately to the slope of the rising area of the fish's head, the method further comprising applying the inclined pressure surface in a downward direction to the rising area of the fish's head.

5. The method of claim 1, further comprising laying the fish on a substrate having an edge and guiding the fish along the edge during the application of pressure by the pressure part.

6. The method of claim 5, further comprising applying pressure to the fish via the pressure part in a direction toward the edge.

7. The method of claim 6, further comprising applying pressure to the fish via the pressure part in a direction toward the fish's body.

8. The method of claim 5, wherein the pressure part has a pressure surface that is inclined in a longitudinal direction of the fish and also transversely to the longitudinal direction of the fish, the method further comprising applying the pressure part to the fish to position the fish in both the longitudinal and transverse directions.

9. The method of claim 8, wherein the pressure surface is applied to a rising area of the fish's head that rises both in the longitudinal direction of the fish and also transversely to the longitudinal direction of the fish.

10. The method of claim 1, further comprising using a braking device to stop the displacement of the fish.

11. The method of claim 10, wherein the displacement of the fish is stopped by engaging a fin or gill of the fish with the braking device.

12. The method of claim 1, further comprising controlling the movement of the pressure part using a four-bar chain.

13. The method of claim 12, further comprising connecting a first part of the four-bar chain, which controls horizontal movement of the pressure part, via a coupling joint to a second part of the four-bar chain, which controls vertical movement of the pressure part.

14. The method of claim 13, further comprising mounting the first part and the second part of the four-bar chain independently of one another in pivot joints, each of which is attached to a support.

15. The method of claim 14, further comprising pivoting the first part and the second part of the four-bar chain around pivot axes of the pivot joints, wherein the pivot joints run in vertical planes parallel to one another.

16. The method of claim 13, further comprising lowering the four-bar chain by its second part in a direction toward the fish and pressing the pressure part against the fish by an extension spring.

17. The method of claim 12, further comprising laying the fish on a substrate having an edge, wherein the movement of the pressure part is kept at a distance from the edge that is nearly constant.

18. The method of claim 12, further comprising controlling the four-bar chain using at least one disk cam.

19. The method of claim 18, further comprising moving the four-bar chain according to an external control curve of the disk cam to control horizontal movement of the pressure part.

20. The method of claim 19, further comprising moving the four-bar chain according to an internal control curve of the disk cam to control vertical movement of the pressure part.

21. The method of claim 19, further comprising laying the fish on a substrate having an edge, wherein the pressure part is controlled relative to the edge by the external control curve.

22. The method of claim 21, further comprising moving the pressure part at a distance to the edge that remains nearly constant.

23. The method of claim 18, further comprising moving a pressure surface of the pressure part along a guide curve such that the pressure surface moves in a horizontal plane when the pressure part is in a lowered state and moves in a vertical curve when the pressure part is in a raised state.

24. The method of claim 23, further comprising moderately accelerating the movement of the pressure part at the transition from the planar movement to the curved movement on the guide curve, and moderately delaying the movement of the pressure part at the transition from the curved movement to the planar movement on the guide curve.

25. The method of claim 23, further comprising mounting the disk cam on a drive axis that runs parallel to the pivot axes of a pivot joint.

26. The method of claim 25, further comprising using an external control curve to convert a uniform angular velocity of the drive axis into a uniform angular velocity of the pressure part in the planar movement on the guide curve and an angular velocity of the pressure part which first rises in the curved movement toward its middle and then falls.

27. A device for positioning a fish in a heading machine, wherein the heading machine has a substrate upon which a fish is placed and a blade suitable for heading the fish, the device comprising:
- a pressure part having a pressure surface configured to be lowered onto to a surface area of the fish that is rising relative to the substrate on which the fish is placed,
- wherein the pressure surface is configured to slide against the rising area of the fish, and
- wherein, under a force of the pressure surface of the pressure part being lowered onto the rising area of the fish, the fish is displaced and positioned for heading.

28. The device according to claim 27, further comprising an edge relative to the substrate that orients the fish with a longitudinal axis of the fish being transverse to a cutting plane defined by the blade.

29. The device according to claim 28, wherein the pressure part is further configured to apply pressure to the rising area of the fish in a direction toward the edge.

30. The device according to claim 29, wherein the pressure surface of the pressure part is inclined in two directions and is configured to apply a force to the fish in both the fish's longitudinal axis and in its transverse axis in the direction toward the edge.

31. The device according to claim 28 further comprising a four-bar chain, wherein the four-bar chain controls the movement of the pressure part such that the pressure part moves in both a horizontal and vertical plane in accordance with at least one predefined control curve.

32. The device according to claim 31, further comprising a disk cam configured with at least two control curves of which an external control curve is provided for controlling the pressure part in the horizontal plane and an internal control curve is provided for controlling the pressure part in the vertical plane.

33. The device according to claim 31, wherein the pressure part is configured to move according to a guide curve, and wherein the guide curve runs in a plane when the pressure part has been lowered onto the rising area of the fish and runs in a curve when the pressure part has been raised from the fish.

34. The device according to claim 33, wherein the four-bar chain is configured to accommodate a slight acceleration and/or delay of the pressure part at the transition from the planar part into the curved part of the guide curve.

35. The device according to claim 34, wherein the control curve on one side of the four-bar chain and struts on the other side of the four-bar chain run in first planes that are plane parallel to one another, and which run diagonally to a second plane spanned by the edge.

36. The device according to claim 35, wherein the pressure part is attached to a strut that is parallel to the edge.

37. The device according to claim 33, wherein the pressure part has a higher angular velocity in the curved part of the guide curve than in the planar part of the guide curve, and the particular angular velocity is controlled in accordance with an arrangement of pivot joints in the four-bar chain and its incline in relation to a plane spanned by the edge.

38. The device of claim 31, wherein a first part of the four-bar chain, which controls horizontal movement of the pressure part, is connected via a coupling joint to a second part of the four-bar chain, which controls vertical movements of the pressure part.

39. The device of claim 38, wherein the first part and the second part of the four-bar chain are mounted independently of one another in pivot joints, each of which is attached to a support.

40. The device of claim 39, wherein the first part and the second part of the four-bar chain are each configured to pivot around pivot axes of the pivot joints, wherein the pivot joints run in vertical planes running plane parallel to one another and each of which runs at an angle to a vertical plane spanned by the edge.

* * * * *